W. C. MacBAIN.
TOOL REST FOR LATHES.
APPLICATION FILED NOV. 3, 1908.
921,858.
Patented May 18, 1909.
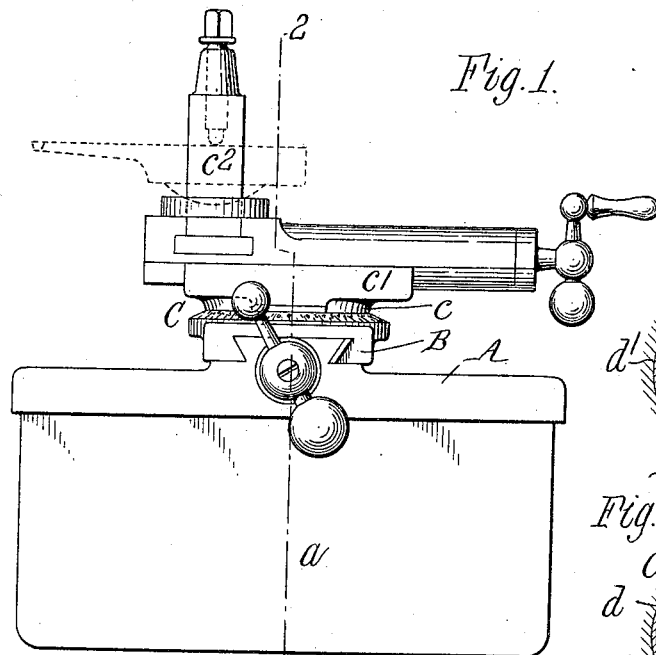
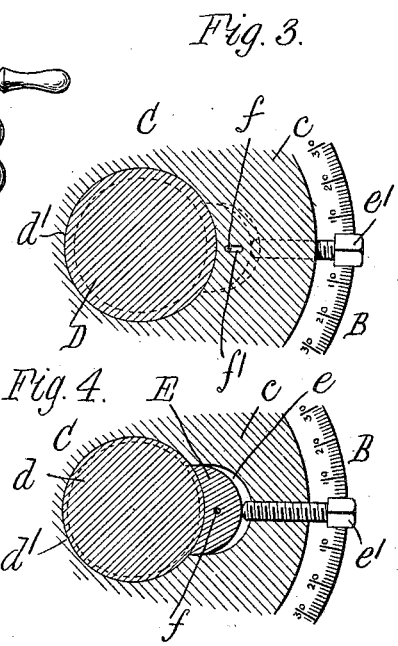
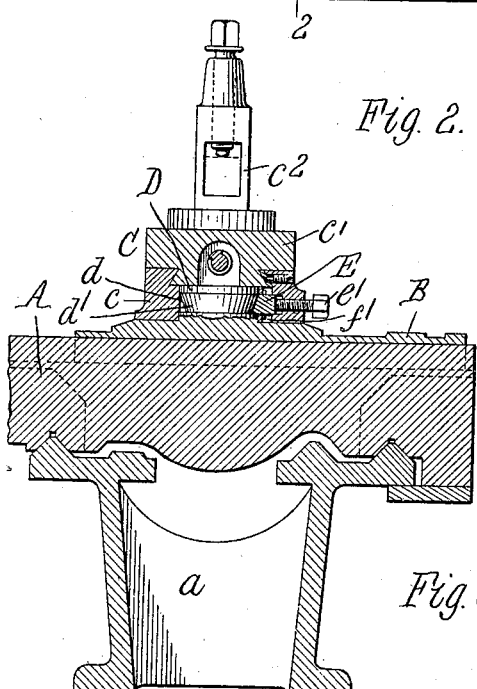
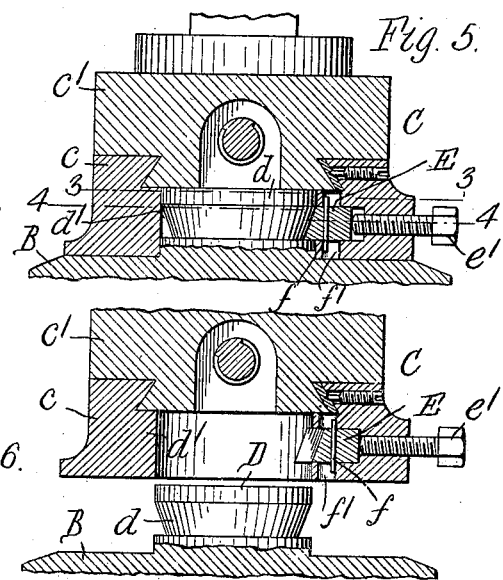
Witnesses:
A. G. Dimond.
E. A. Volk.
Inventor.
Warren C. MacBain,
By Wilhelm, Parker & Hard,
Attorneys
THE NORRIS PETERS CO., WASHINGTON, D. C.

UNITED STATES PATENT OFFICE.

WARREN C. MacBAIN, OF SENECA FALLS, NEW YORK, ASSIGNOR TO THE SENECA FALLS MANUFACTURING COMPANY, OF SENECA FALLS, NEW YORK.

TOOL-REST FOR LATHES.

No. 921,858.   Specification of Letters Patent.   Patented May 18, 1909.

Application filed November 3, 1908.   Serial No. 460,806.

*To all whom it may concern:*

Be it known that I, WARREN C. MACBAIN, a citizen of the United States, residing at Seneca Falls, in the county of Seneca and State of New York, have invented a new and useful Improvement in Tool-Rests for Lathes, of which the following is a specification.

This invention relates to improvements in securing or clamping devices for the rotatable tool rests of lathes and analogous machine tools, and more particularly to such devices intended for retaining the rotatable compound rest or tool block on the cross slide of the lathe and for clamping the same thereon in its different adjustments.

The object of the invention is to provide a securing or clamping device for this purpose, of simple and inexpensive construction, which will detachably secure the two members together, while permitting free rotary adjustment of one member relative to the other, and which can be readily actuated to firmly clamp the adjustable member against the other member to hold it rigidly in different adjusted positions.

In the accompanying drawing: Figure 1 is a front elevation of a lathe carriage provided with a tool rest embodying the invention. Fig. 2 is a fragmentary sectional elevation of the same and the lathe bed, on line 2—2, Fig. 1. Fig. 3 is a fragmentary horizontal section through the securing or clamping device, on line 3—3, Fig. 5. Fig. 4 is a similar section on line 4—4, Fig. 5. Fig. 5 is a fragmentary sectional elevation, on an enlarged scale, of the securing or clamping device and the parts connected thereby. Fig. 6 is a similar view showing the securing or clamping device released and the parts detached.

Like letters of reference refer to like parts in the several figures.

The lathe shown in the drawing to which the securing or clamping device is applied, is of common construction, having a compound tool rest, and comprises a carriage A mounted upon the lathe bed $a$, a cross slide B which is movable transversely upon the carriage, and a compound rest C comprising a rotatable base block $c$, a rest slide $c'$ mounted to slide transversely of said block, and a tool holder $c^2$ secured to this slide. All of these parts may be of any suitable construction and arrangement, the present invention relating only to the means by which the compound rest is retained and clamped in its different positions upon the cross slide, which is as follows: The cross slide B has a cylindrical pivot post D projecting from its upper face, which is preferably provided with a downwardly-tapering intermediate or waist portion $d$, and the rotatable base block $c$ has a central cylindrical hole or opening $d'$ which is adapted to fit over the post and allow the block to turn thereon. The bottom face of the base block $c$ bears directly upon the top face of the cross slide and these contacting faces assist the pivot post in forming a stable bearing for the rest. The base block $c$ is provided with an inwardly opening pocket $e$ at one side thereof in which is confined a sliding clamp block E which is preferably of crescent shape, having an inner end face which is curved and beveled correspondingly to the tapering waist of the pivot post, which it is adapted to engage. An adjusting screw $e'$ is screwed in the base block $c$ and engages the clamp block for forcing it inwardly against the post D. The adjusting screw can be actuated by a suitable wrench or tool applied to its exposed outer end or head. The clamp block E is preferably secured in its pocket by a pin $f$ which extends through the clamp block with its ends projecting into slots $f'$ in the base block $c$, such slots being of sufficient length to permit the clamp to be moved into and out of engagement with the post D, but preventing the clamp from slipping out of its pocket when the tool rest has been removed from the cross slide. Any other suitable means, however, may be employed for this purpose. The beveled engaging faces of the clamp block and pivot post permit the clamp block to be adjusted so that its face will extend beneath the beveled face of the post without binding upon the same and will thus retain the tool rest upon the cross slide while at the same time permitting free rotary adjustment of the rest thereon. The further adjustment of the clamp block produces a wedging action between these beveled faces which serves to draw the base block firmly down upon the cross slide and clamp the parts together, thereby securely locking the base block against movement.

To remove the tool rest from the cross slide, it is only necessary to release the adjusting screw $e'$. The tool rest may then be readily removed, the beveled faces of the clamp block and pivot post sliding upon each other and forcing the clamp block back in its pocket out of engagement with the post.

The engaging faces of the clamp block and post are preferably curved correspondingly with each other, thus giving the clamp block a more extended bearing surface on the post and increasing the effectiveness of the clamp, but this construction is not absolutely essential.

While the device is shown as applied to a lathe having a compound tool rest, it may, of course, be used in lathes and analogous machines for securing and clamping rotatable tool rests and blocks of other forms of construction to the cross slide or supporting member therefor.

I claim as my invention:

1. The combination with a support having a pivot post, of a tool rest mounted on said support and rotatably adjustable about said post, and a clamp adjustably secured in said tool rest and adapted to engage said post for detachably retaining said tool rest on said support, the engaging faces of said clamp and said post being correspondingly beveled whereby said clamp acts, when forced against said post, to draw said tool rest against said support and firmly clamp it thereon, substantially as set forth.

2. The combination with a support, of a tool rest which is rotatably mounted thereon, one of said parts having a pivot post which enters an opening in the other part, said opening being of a size to adapt the part having it to be slipped onto and off of said post, and a clamp which is adjustably secured in said part having the opening and adapted to engage said pivot post for detachably securing said tool rest to said support, the engaging faces of said clamp and said post being correspondingly beveled whereby said clamp acts, when forced against said post, to draw said tool rest against said support and firmly clamp it thereon, substantially as set forth.

3. The combination with a tool rest and a support therefor, of a pivot post projecting from said support and entering an opening in said tool rest whereby said rest is rotatably adjustable on said support, said opening being of a size to adapt said tool rest to be slipped onto and off of said post, and a clamp carried by said tool rest for engaging said post to secure said rest in adjusted positions thereon, said clamp when released freeing said tool rest and permitting it to be removed from said post, substantially as set forth.

Witness my hand, this 28th day of October, 1908.

WARREN C. MacBAIN.

Witnesses:
J. C. RUTHERFORD,
J. C. DAVIS.